United States Patent [19]

Fallen et al.

[11] Patent Number: 5,566,856
[45] Date of Patent: Oct. 22, 1996

[54] HOT FOOD AND FROZEN FOOD VENDING MACHINE

[75] Inventors: Norma Fallen; Tony Rivera, both of 130 Danette Cir., Reno, Nev. 89511; Doug Snyder; David Travis, both of Benicia, Calif.

[73] Assignees: Norma Fallen; Tony Rivera, both of Reno, Nev.

[21] Appl. No.: 710,434

[22] Filed: Jun. 6, 1991

[51] Int. Cl.$^6$ ................................................ A24F 27/14
[52] U.S. Cl. .................................. 221/150 HC; 99/357; 219/10.55 R
[58] Field of Search ...................... 221/150 HC, 150 A, 221/192, 191, 277, 268; 219/10.55 R; 99/357, 443 R; 414/662, 672, 669

[56] References Cited

U.S. PATENT DOCUMENTS

| | | |
|---|---|---|
| 3,481,499 | 12/1969 | Pierson et al. ........................ 414/669 |
| 3,653,541 | 4/1972 | Crum ................................ 221/150 HC |
| 4,398,651 | 8/1983 | Kumpfer .......................... 221/150 HC |
| 4,783,582 | 11/1988 | Wada et al. ......................... 221/150 H |
| 5,160,238 | 11/1992 | Kambara ................................ 414/672 |

Primary Examiner—Kenneth W. Noland
Attorney, Agent, or Firm—Brian C. Kelly; Hawkins Folsom Muir & Kelly

[57] ABSTRACT

This invention includes a method and apparatus for vending frozen foods and also for vending hot previously frozen foods. The invention includes the use of a microwave oven, and a delivery system that maintains the food in an upright orientation so as to prevent spilling of hot foods. An important feature is that the invention does not destroy the microwave containment integrity of the microwave oven and therefore is safer from a radiation perspective.

10 Claims, 8 Drawing Sheets

HOT FOOD AND FROZEN FOOD VENDING MACHINE

FIELD OF THE INVENTION

This is generally vending machines for delivering food entries and desserts that are stored at sub-freezing temperatures and are served either hot or frozen.

BACKGROUND OF THE INVENTION

Since the popularity of the microwave oven, people have been trying to develop a reliable microwave incorporated into a vending machine. Most attempts such as U.S. Pat. Nos. 4,398,651 to Kumpter and 3,620,341 to Gardner disclose microwave ovens with multiple openings cut therein. These patents teach the use of multiple openings for efficient article handling. Every additional opening cut into a microwave oven decreases its reliability in containing radiation leaks.

Applicant's invention overcomes these short comings of the prior art in part by using a single door microwave oven thus ensuring radiation leak integrity.

OBJECTS OF THE INVENTION

It is a first object of the invention to provide a system and apparatus for storing food items at sub-freezing temperatures and vend them at appropriate temperatures for public consumption.

It is a second object of the invention to provide a system and apparatus for vending frozen food items.

It is a third object of the invention to provide a fast and efficient delivery system and apparatus.

It is a fourth object of the invention to provide a system and apparatus which incorporates a single door microwave body to insure radiation integrity.

It is a fifth object of the invention to provide an electronic inventory control.

It is a sixth object of the invention to provide an electronic maintenance diagnostic system.

SUMMARY OF THE INVENTION

The above listed objects are realized by the following invention: a vending apparatus including a freezer area having at least one magazine for holding food cartons, some means for transporting the food carton out of the freezer area, and some means for dispensing the food carton to an operator.

The objects are also realized in part by the following method: a method of vending food contained in cartons comprising the steps of:

a customer making a selection;

transmitting that information to a computer;

moving a magazine containing one or more cartons containing said customer's selection into position for dispensing from a freezer area;

moving a single carton through a door and out of the freezer area onto a platform which is cooperatively attached to an elevator;

opening a door of a microwave oven for heating the food in the carton;

lowering the elevator cooperatively such that the carton is deposited onto a platform of microwave translucent material affixed to the door of the microwave oven in the same upright orientation;

closing the door and cooking the food by microwave means;

reopening the door and collecting the carton of now cooked food on the elevator platform and rotating the carton into position for final dispensing; and dispensing the carton.

DESCRIPTION OF THE PREFERRED EMBODIMENTS

Figure 1:
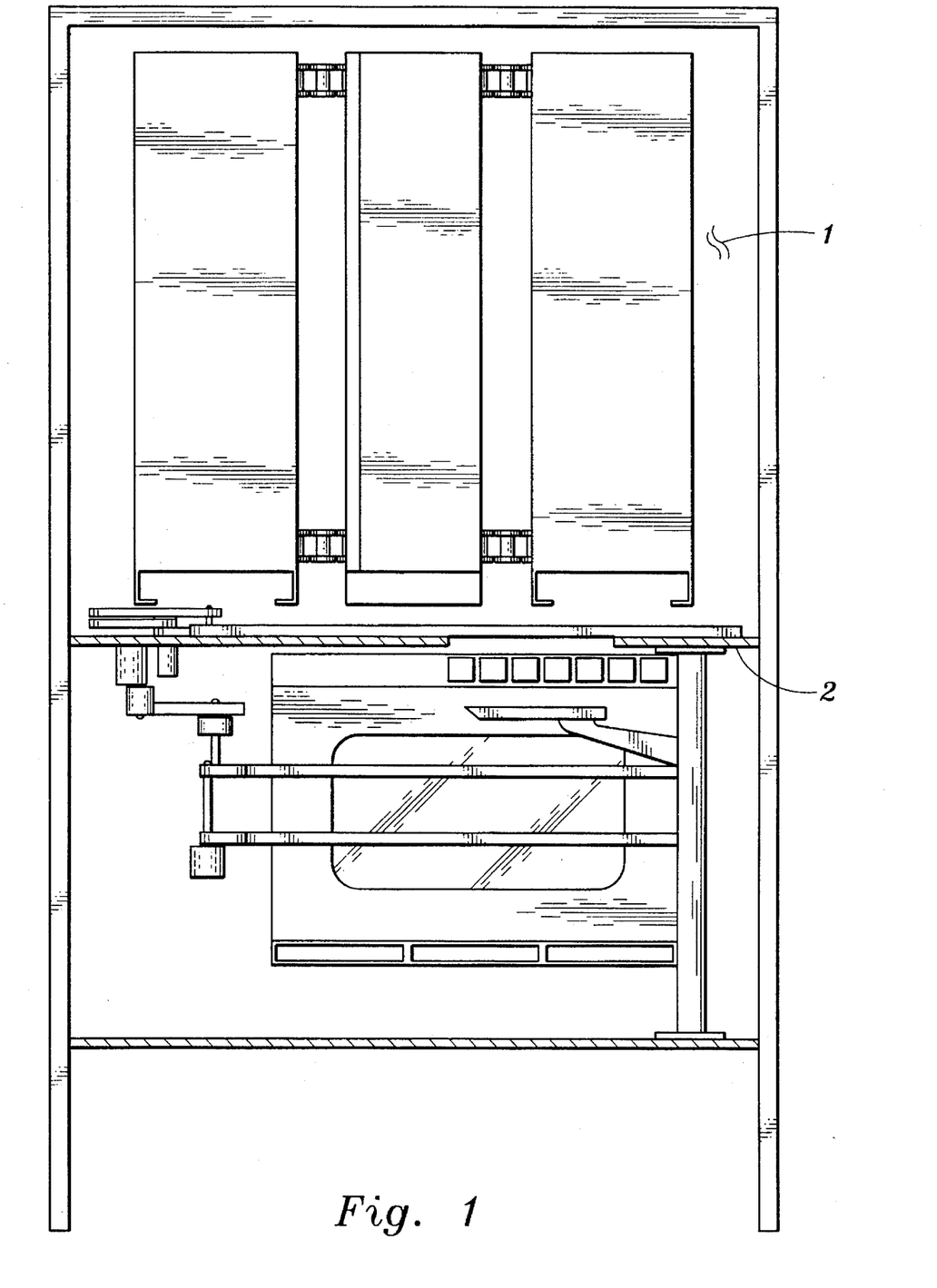
FIG. 1 shows a skeletal side view of the apparatus giving relative orientations for the freezer section and the microwave oven and elevator.

Referring now to the drawings, FIG. 1 shows a view of the skeleton of the invention from a side view. The freezer area 1 is contained by platform 2 and will be maintained at temperatures between 32° F. and −15° F. with the temperature being 0° F. in a preferred embodiment.

Figure 2:
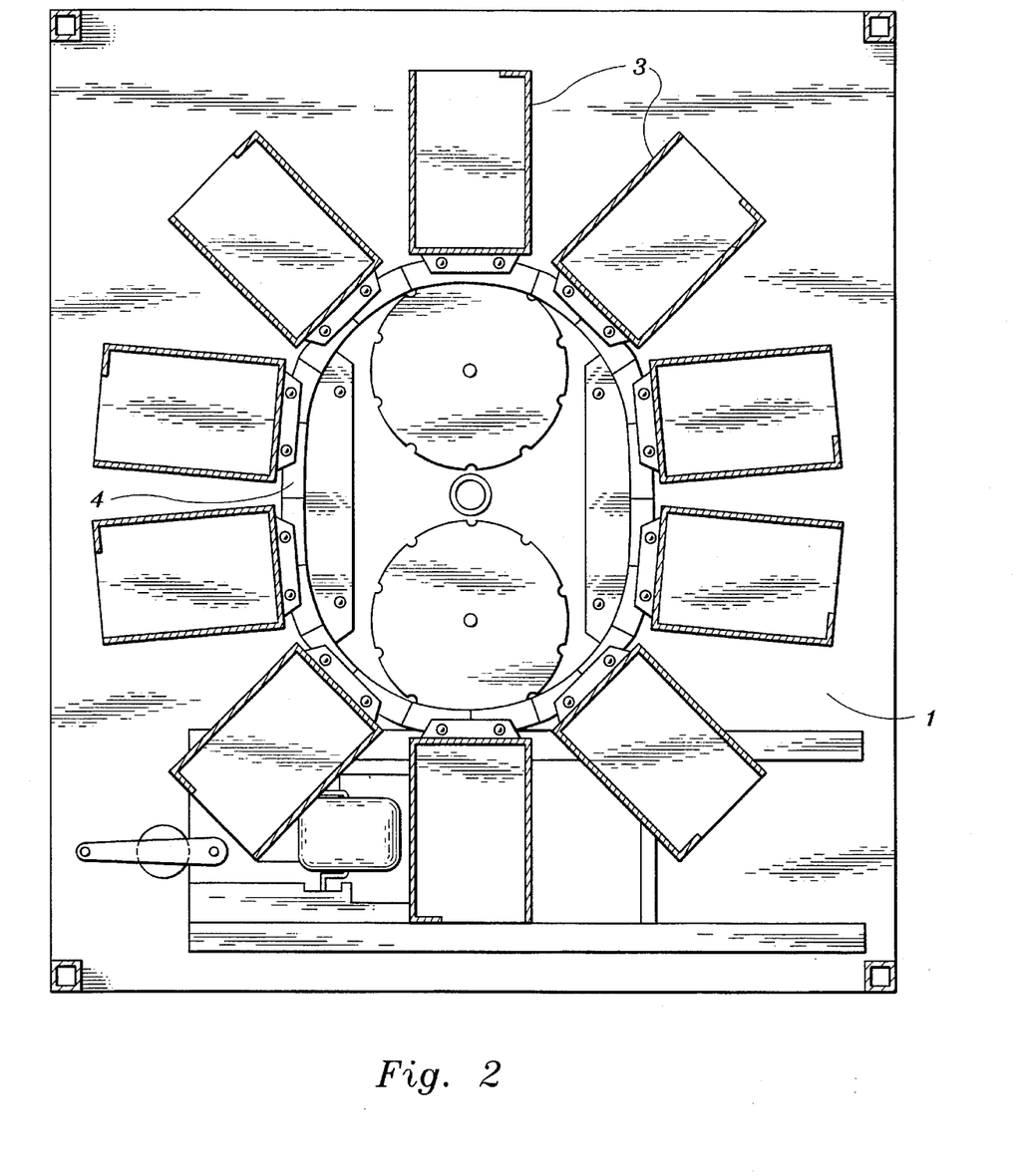
FIG. 2 shows a top view of the freezer section with the outer skin removed to show the details of the carosel and magazines.

FIG. 2 shows a top view of the invention with the outer skin and insulation cut away. The food item magazines 3 are arranged on a race track 4. This inventory handling system will be operated in the sub-freezing temperatures of the freezer area 1.

Figures 3A, 3B, 3C:
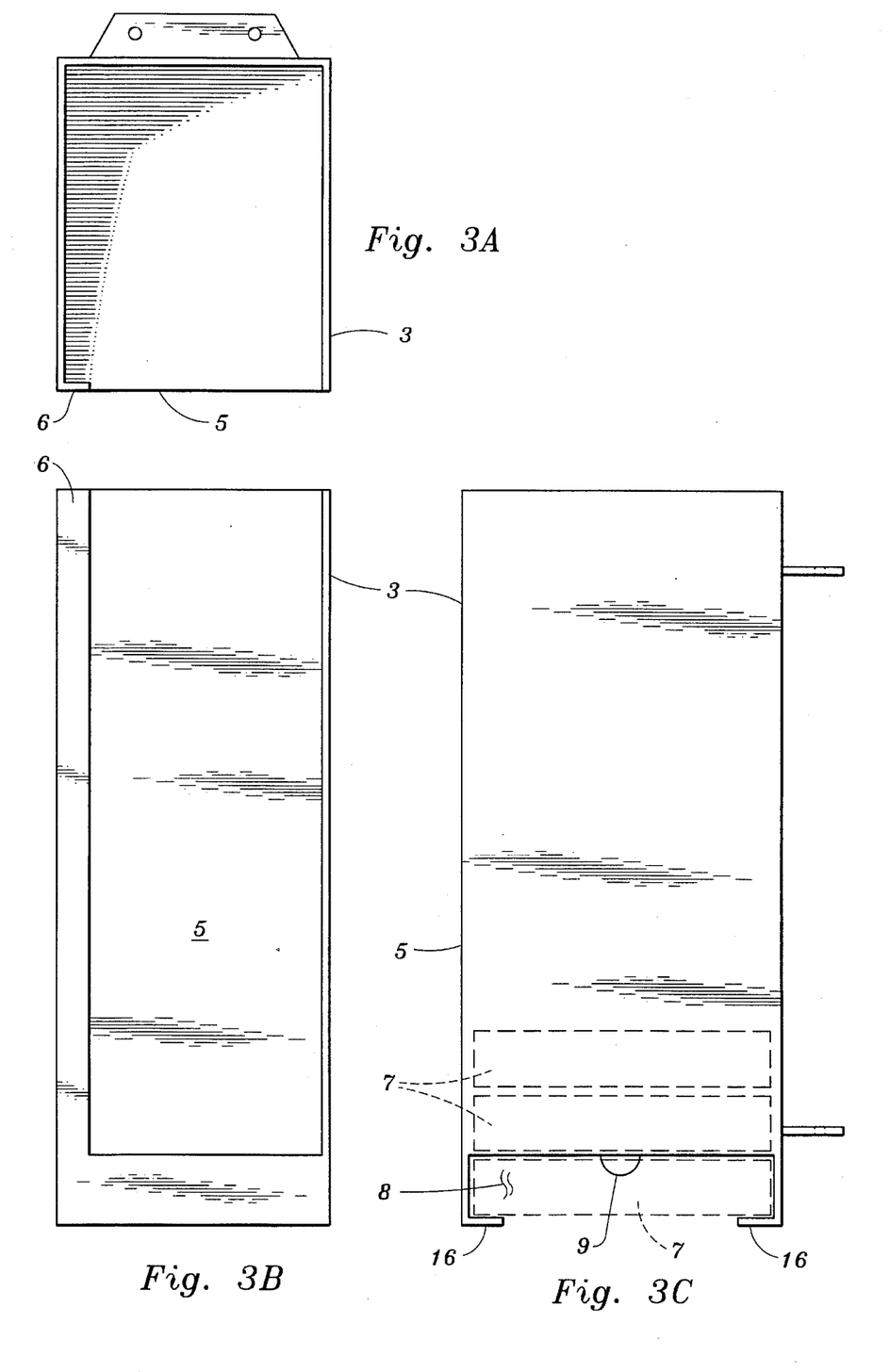
FIG. 3 shows a top section view of a magazine, a front view of a magazine and a side view of a magazine with food cartons loaded therein.

FIG. 3 shows a magazine 3 in more detail. Each magazine is open on one side 5 and faces outward when the magazine 3 is mounted on the carousel 4. The open side 5 has a partial door 6 for retaining food cartons 7. FIG. 3 shows the single carton opening 8 and brush 9 which provides that one carton 7 will be moved from the freezer area 1 per operation by application of drag and down force on the carton 7.

Figure 4A:
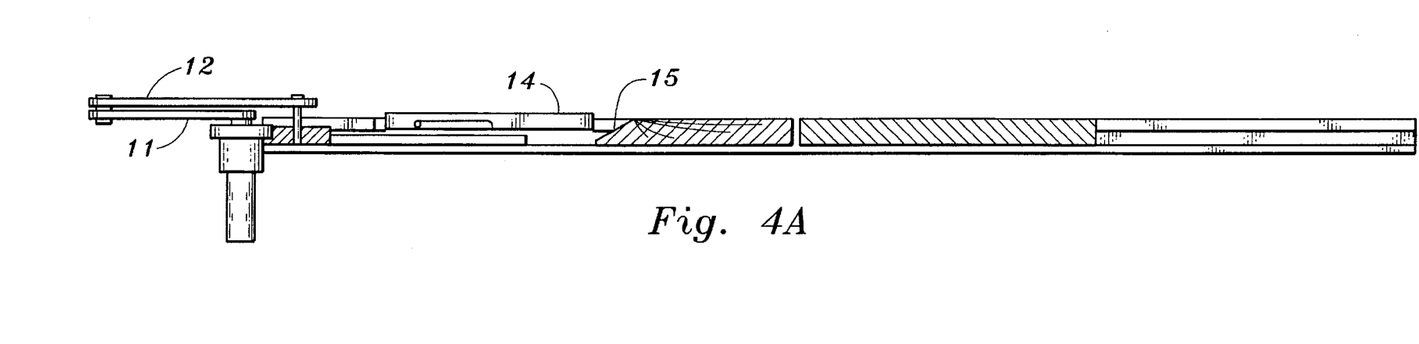
FIG. 4 shows a side sectional and top view of the door mechanism between the freezer area and the microwave and processing area in the closed or retracted position.
Figure 4B:
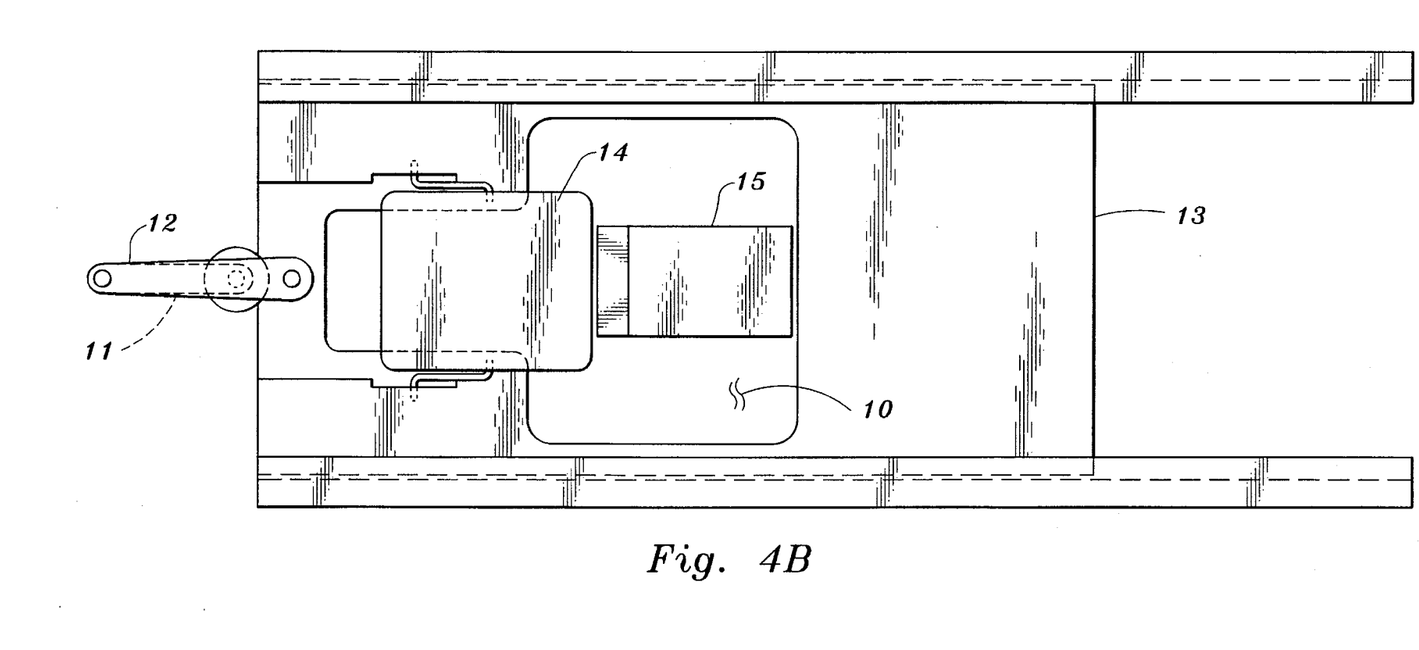
Figure 5A:
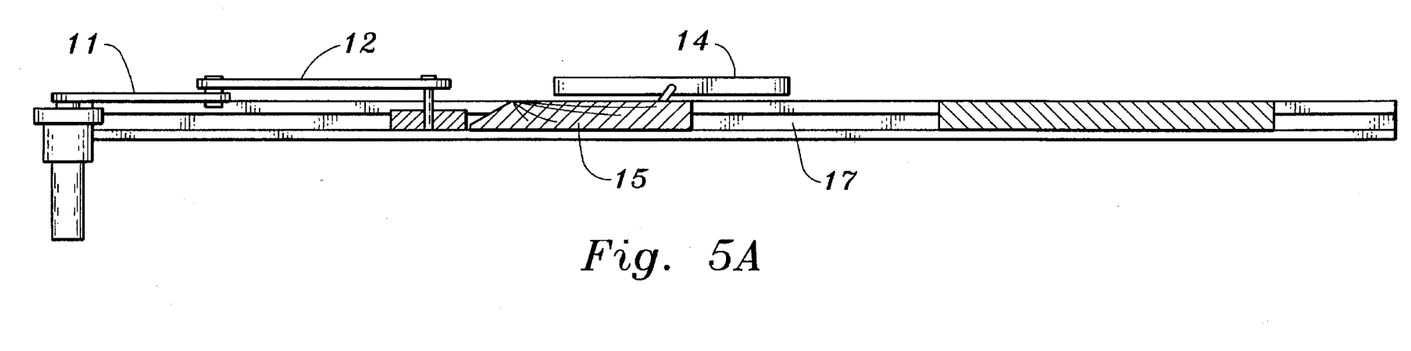
FIG. 5 shows a side view and cross section view through the ramp area of the door of FIG. 4 in the extended or open position.
Figure 5B:
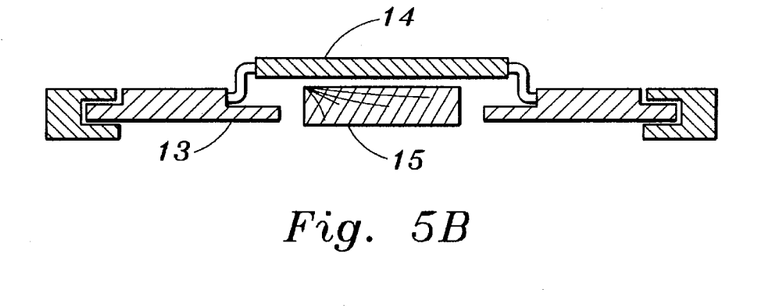
Figure 6A:
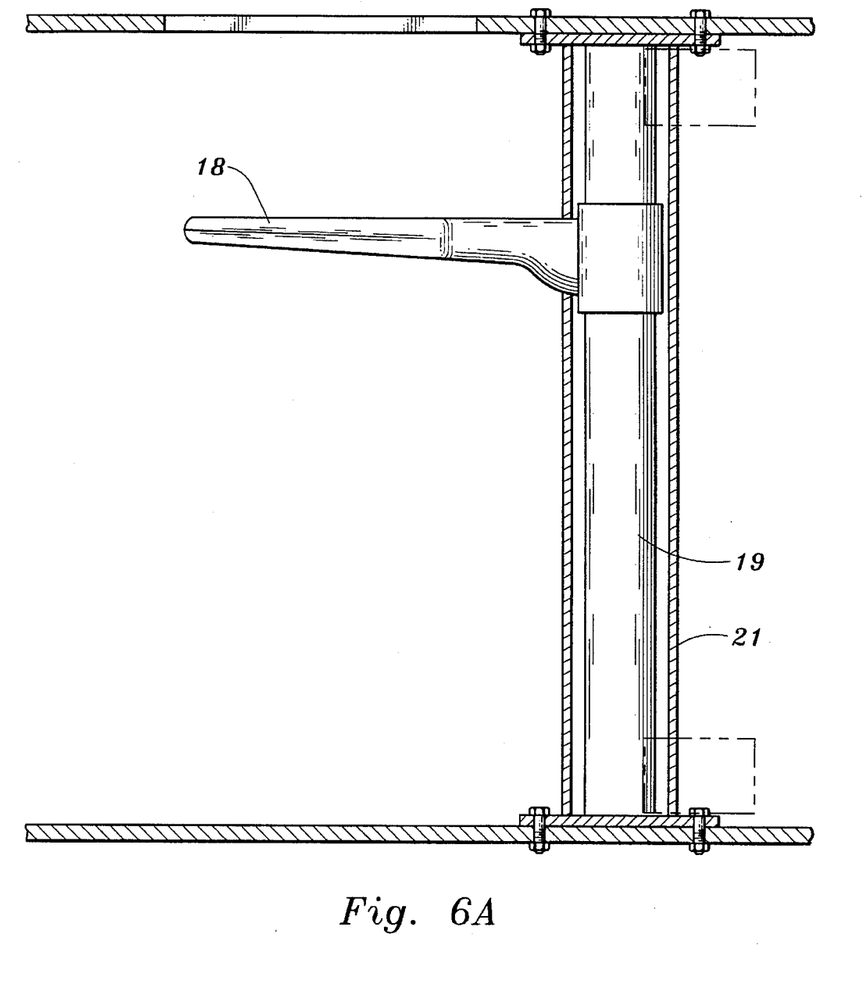
FIG. 6 shows a side view of the elevator through a sectional view of the guide housing and a top view of the platform sectional through the elevator shaft.
Figure 6B:
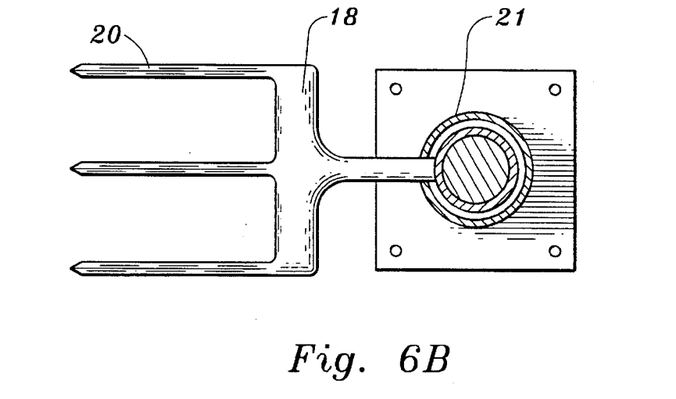

FIG. 4 shows the freezer area trap door 10 for delivering a single carton from inventory and limiting the amount of time that the freezer area is opened. In FIG. 4 the door is in the closed position. The open position shown in FIG. 5 is achieved by rotating link 11 about an end which drives link 12 laterally, causing tray 13 to slide laterally. Tab 14 rides up on ramp 15 to clear tabs 16 of magazine 3 (shown in FIG. 3) and push a carton 7 into the trap door 10 portion of the tray 13. In the fully extended position the trap door 10 lines up with an opening 17 in platform 2 to deposit the carton 7 on elevator platform 18.

Figure 7A:
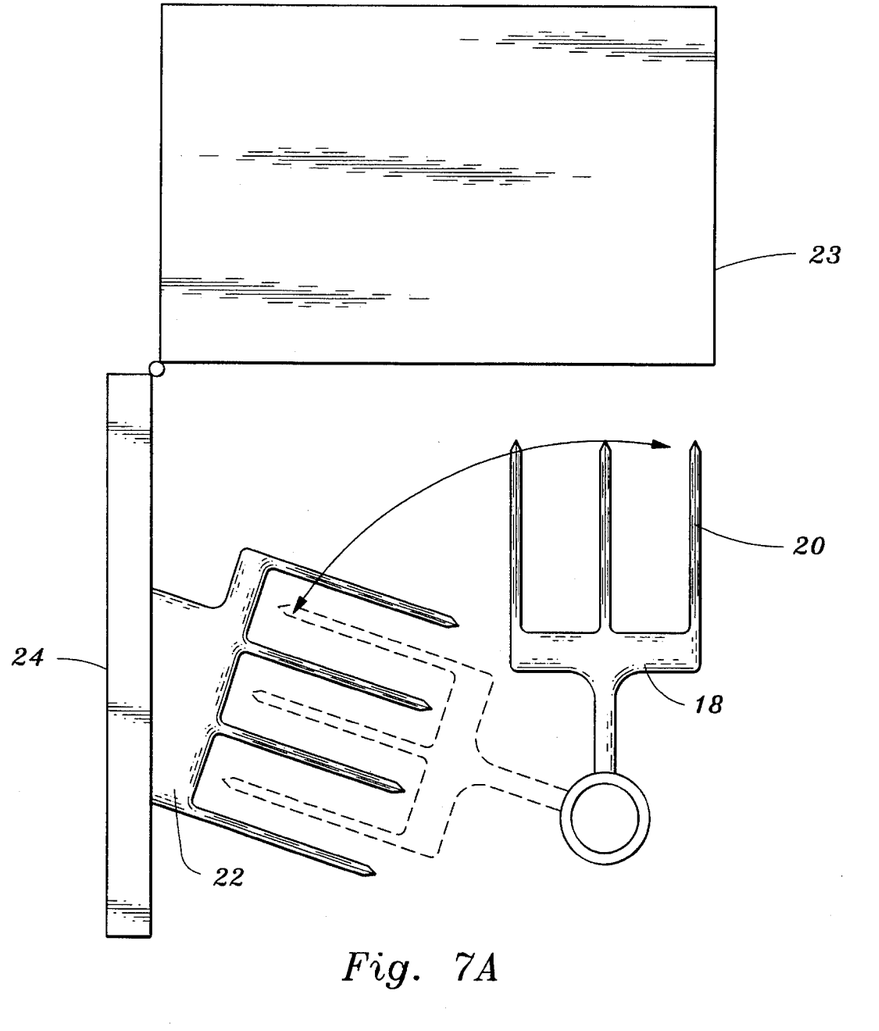
FIG. 7 shows the oven door platform cooperating with the elevator platform, and a detail view of the tines thereof.
Figure 7B:
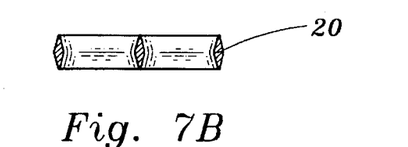
Figure 7C:
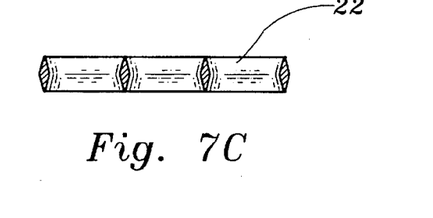

After the carton drops through the opening 17 it is received on elevator platform 18. The platform 18 is mounted on elevator shaft 19 which has a radical thread for high operation speed. The elevator 18 moves the carton 7 down and laterally as it rotates platform 18 about the shaft 19 axis. The platform 18 is configured as shown in FIG. 5 having a comb with widely spaced tines 20 at an opposite end from the elevator shaft 19. The rotation about the axis is provided by rotation of the elevator shaft housing 21. The tines 20 of elevator platform 18 cooperate with similar tines 20 of the oven door platform 22 as shown in FIG. 7. The tines are offset to avoid contact but of narrow horizontal dimension in order to avoid damage should contact be made. Oven door platform 22 is attached to the interior of oven 23 and collects carton 7 when elevator platform 18 cooperatively lowers through door platform 22. Said elevator platform 18 continues down to a rest position below the level of the oven door 24 of microwave 23.

After the cook sequence, microwave door 24 returns to the same position and platforms 18 and 22 reverse roles as elevator platform 18 rises from it rest position. Elevator shaft housing 21 rotates to an ejection position and the carton is pushed off platform 18 to an opening in the external skin such that a portion of the carton protrudes therefrom.

In an alternate operation mode for delivering frozen food products the cooking step is by-passed.

FIG. 7 shows the microwave oven unit 23. Door platform 22 is made of a microwave translucent material and attached to the interior of door 24 with a translucent attachment material such as an appropriate adhesive.

Figure 8A:
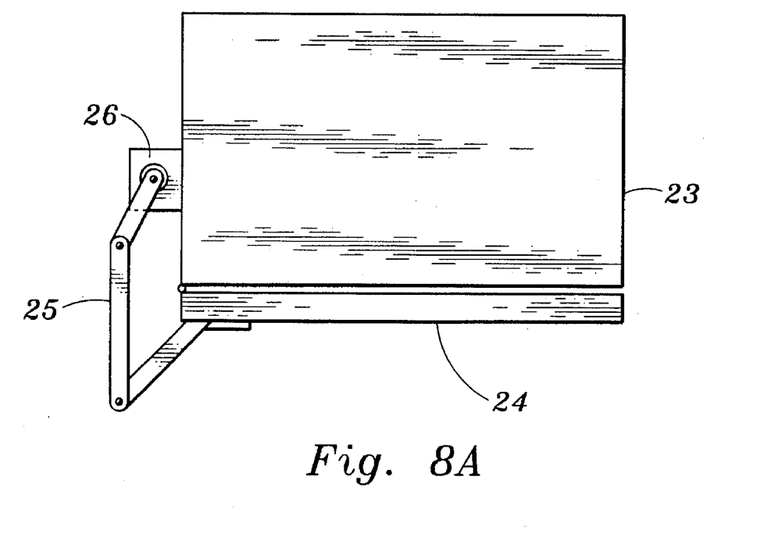
FIG. 8 shows a top view of the oven and the automated door opening and closing apparatus.
Figure 8B:
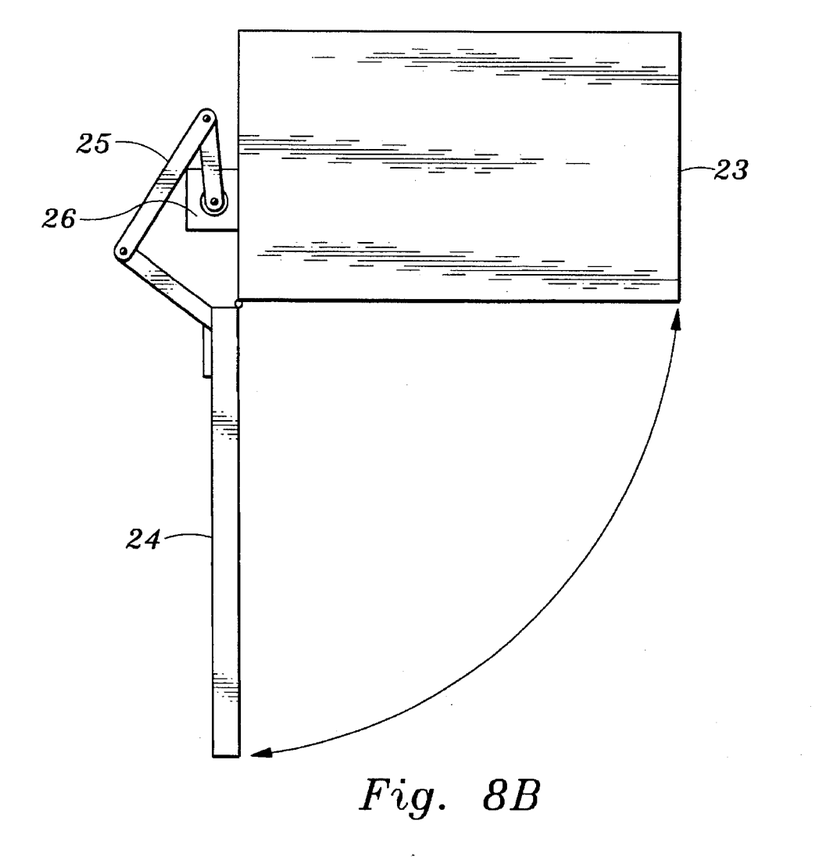

FIG. 8 shows door 24 is externally fitted with a means for attaching an actuation system shown here as a link and lever arm 25.

Motor 26 moves lever 25 to open the door 24 and hold it tightly closed during the cooking sequence. The controls for cooking intensity and time are tapped into the invention's logic system.

In a preferred embodiment, the microwave will have dual microwave generators for faster and more even cooking.

The elevator shaft 19, elevator shaft housing 21 and carousel race track 4 are all driven by compact electric motors.

The electronic logic system incorporates the following features:

In a preferred embodiment, an even number of magazines 3 will consist of two magazines on opposite sides of the carousel having the same food item, thus reducing delivery times. Through a sensor at the magazine position for delivery of a carton and a counting sequence, the magazine position can be known. Failure of magazine to line up generates an error signal. A last carton message and inventory is recorded for each magazine.

Obviously, numerous (additional) modifications and variations of the present invention are possible in light of the above teachings. It is therefore to be understood that within the scope of the appended claims, the invention may be practiced otherwise than as specifically described herein.

What is claimed and desired to be secured by Letters Patent of the United States is:

1. A vending apparatus comprising:

a freezer area, at least one magazine disposed therein for holding food cartons, means for transporting said food carton out of said freezer area comprising elevator means, and means for dispensing said food carton to an operator, further comprising means for maintaining temperatures below freezing in said freezer area, further comprising microwave means for heating food contained in said food cartons through the use of microwaves, further comprising means for moving said food carton from said freezer area into said microwave means while maintaining an upright orientation wherein said means for moving said food carton comprises elevator means comprising means for moving said carton in a vertical direction and means for rotating said carton about a vertical axis of said elevator means, wherein said elevator means comprises a radically threaded gear and a platform with a follower disposed at a first end such that said follower is engaged with said threaded gear and is moved vertically when said threaded gear is rotated about its axis, wherein said elevator means further comprises a guide means such that said follower is constrained to travel by said guide means and said guide means is rotatable about said vertical axis of said elevator means.

2. A vending apparatus as described in claim 1 wherein said elevator means further comprises a guide means such that said follower is constrained to travel by said guide means and said guide means is rotatable about said vertical axis of said elevator means.

3. A vending apparatus as described in claim 2 wherein said platform comprises at least one finger for supporting said carton at a second end.

4. A vending apparatus as described in claim 3 wherein said means for moving said food carton from said freezer area into said microwave comprises an oven platform of microwave translucent material comprising at least one finger which cooperates with said platform of said elevator means such that said elevator means can deposit said food carton on said oven platform during its downward vertical motion and collect said carton again on its upward vertical motion.

5. A vending apparatus as described in claim 4 wherein said microwave means comprises a door that opens laterally in a gate-like fashion, and said oven platform is affixed to said door of said microwave means.

6. A vending apparatus as described in claim 5 wherein said microwave door further comprises automated means for opening, closing and locking said door.

7. A method of vending food contained in cartons comprising the steps of:

a customer makes a selection;

said information is transmitted to a computer file;

a magazine containing one or more cartons containing said customer's selection is rotated into position for dispensing from a freezer area;

a single said carton is moved through a door means out of said freezer area onto a platform cooperatively attached to an elevator means;

a door of a microwave means for heating the food of said carton is opened;

said elevator means cooperatively lowers said carton onto an oven platform of microwave translucent material affixed to said door of said microwave means;

said door closes and said microwave means cooks said food contained in said carton;

said door reopens and said elevator means collects said carton from said oven platform and rotates said carton into a position for final dispensing; and said carton is dispensed.

8. A method for vending frozen food comprising the steps of:

a customer makes a selection;

said information is transmitted to a memory file;

a magazine containing one or more cartons containing said customer's selection is rotated into position for dispensing from a freezer area;

a single said carton is moved through a door means out of said freezer area onto a platform cooperatively attached to an elevator means;

said elevator means cooperatively moves said carton into a position for dispensing; and said carton is dispensed.

9. An elevator device comprising a radical threaded gear, a follower in contact with said gear and actuated vertically by rotation of said gear, a guide means for constraining travel of said follower such that said guide means is rotatable about a longitudinal axis of said gear, a platform extending from said follower for receiving a food carton for elevation wherein said platform further comprises at least one tine for cooperating with at least one tine of an oven platform for moving a carton into a microwave means.

10. A vending machine comprising a freezer area for storing an inventory of cartons containing food transportation means for moving said cartons from said freezer area into a microwave means while maintaining said carton in an upright orientation wherein said moving means comprises an elevator platform comprising tines in a fork-like orientation, and a platform affixed to said microwave means comprising similar tines such that said platforms cooperate in by-passing one another and transferring said carton while maintaining its upright orientation.

* * * * *